United States Patent
Bulan et al.

(10) Patent No.: US 9,714,472 B2
(45) Date of Patent: Jul. 25, 2017

(54) GAS DIFFUSION ELECTRODES AND PROCESS FOR PRODUCTION THEREOF

(75) Inventors: Andreas Bulan, Langenfeld (DE);
Jürgen Kintrup, Leverkusen (DE);
Norbert Schmitz, Engelskirchen (DE);
Alexander Karpenko, Leverkusen (DE); Jens Aβmann, Haan (DE)

(73) Assignee: COVESTRO DEUTSCHLAND AG, Leverkusen (DE)

(*) Notice: Subject to any disclaimer, the term of this patent is extended or adjusted under 35 U.S.C. 154(b) by 1136 days.

(21) Appl. No.: 13/616,266

(22) Filed: Sep. 14, 2012

(65) Prior Publication Data

US 2013/0078536 A1    Mar. 28, 2013

(30) Foreign Application Priority Data

Sep. 23, 2011  (DE) .......................... 10 2011 083 314

(51) Int. Cl.
| | |
|---|---|
| *C25B 1/46* | (2006.01) |
| *C25B 11/03* | (2006.01) |
| *C25B 11/04* | (2006.01) |
| *H01M 4/86* | (2006.01) |
| *H01M 4/88* | (2006.01) |
| *H01M 4/90* | (2006.01) |
| *H01M 12/04* | (2006.01) |
| *H01M 12/08* | (2006.01) |
| *H01M 8/1018* | (2016.01) |

(52) U.S. Cl.
CPC .............. *C25B 1/46* (2013.01); *C25B 11/035* (2013.01); *C25B 11/0478* (2013.01); *C25B 11/0489* (2013.01); *H01M 4/8605* (2013.01); *H01M 4/886* (2013.01); *H01M 4/8807* (2013.01); *H01M 4/9016* (2013.01); *H01M 4/9041* (2013.01); *H01M 4/9075* (2013.01); *H01M 12/04* (2013.01); *H01M 12/08* (2013.01); *H01M 2008/1095* (2013.01); *Y02E 60/128* (2013.01)

(58) Field of Classification Search
None
See application file for complete search history.

(56) References Cited

U.S. PATENT DOCUMENTS

| | | | |
|---|---|---|---|
| 4,568,442 A | 2/1986 | Goldsmith | |
| 4,581,116 A * | 4/1986 | Plowman | C25B 11/035 204/284 |
| 7,201,888 B2 | 4/2007 | Berube et al. | |
| 8,133,932 B2 | 3/2012 | Kijlstra et al. | |
| 2006/0175195 A1 | 8/2006 | Yamada et al. | |
| 2006/0263232 A1* | 11/2006 | Bulan | C25B 11/035 419/9 |
| 2013/0037415 A1* | 2/2013 | Izawa | C25B 1/34 205/510 |

FOREIGN PATENT DOCUMENTS

| | | | | |
|---|---|---|---|---|
| EP | 1 925 695 A2 | 5/2008 | | |
| JP | WO 2011102331 A1 * | 8/2011 | ............... | C25B 1/34 |
| WO | WO-03/023090 A1 | 3/2003 | | |

OTHER PUBLICATIONS

European Search Report for EP 12 18 5149 dated Apr. 1, 2014.

* cited by examiner

*Primary Examiner* — Sarah A Slifka
(74) *Attorney, Agent, or Firm* — Drinker Biddle & Reath LLP

(57) ABSTRACT

A gas diffusion electrode is described, especially for use in chloralkali electrolysis, said gas diffusion electrode having finely divided components on the liquid side. The electrode is notable for a low perviosity to gases and a lower operating voltage.

21 Claims, 1 Drawing Sheet

GAS DIFFUSION ELECTRODES AND PROCESS FOR PRODUCTION THEREOF

BACKGROUND OF THE INVENTION

The invention relates to an oxygen-consuming electrode, especially for use in chloralkali electrolysis, with an improved catalyst coating, and to an electrolysis apparatus. The invention further relates to a production process for the oxygen-consuming electrode and to the use thereof in chloralkali electrolysis or fuel cell technology.

The invention proceeds from oxygen-consuming electrodes known per se, which take the form of gas diffusion electrodes and typically comprise an electrically conductive carrier and a gas diffusion layer and a catalytically active component.

Oxygen-consuming electrodes, also called OCEs for short hereinafter, are one form of gas diffusion electrodes. Gas diffusion electrodes are electrodes in which the three states of matter—solid, liquid and gaseous—are in contact with one another, and the solid electron-conducting catalyst catalyses an electrochemical reaction between the liquid and gaseous phases. The solid catalyst has usually been pressed to a porous film, typically having a thickness of more than 200 μm.

Various proposals for operation of the oxygen-consuming electrodes in electrolysis cells on the industrial scale are known in principle from the prior art. The basic idea is to replace the hydrogen-evolving cathode in the electrolysis (for example in chloralkali electrolysis) with the oxygen-consuming electrode (cathode). An overview of the possible cell designs and solutions can be found in the publication by Moussallem et al "Chlor-Alkali Electrolysis with Oxygen Depolarized Cathodes: History, Present Status and Future Prospects", J. Appl. Electrochem. 38 (2008) 1177-1194.

The oxygen-consuming electrode—also called OCE for short hereinafter—must meet a series of fundamental requirements to be usable in industrial electrolysers. For instance, the catalyst and all other materials used must be chemically stable towards about 32% by weight sodium hydroxide solution and towards pure oxygen at a temperature of typically 80-90° C. Equally, a high degree of mechanical stability is required, in that the electrodes are incorporated and operated in electrolysers of a size of typically more than 2 m² in area (technical size). Further properties are: a high electrical conductivity, a low layer thickness, a high internal surface area and a high electrochemical activity of the electrocatalyst. Suitable hydrophobic and hydrophilic pores and an appropriate pore structure for conduction of gas and electrolyte are needed, as is imperviosity, such that gas and liquid spaces remain separated from one another. Long-term stability and low production costs are further particular requirements on an industrially usable oxygen-consuming electrode.

A further development trend for utilization of OCE technology in chloralkali electrolysis is that of zero gap technology. In this case, the OCE is in direct contact with the ion exchanger membrane, which separates the anode space from the cathode space in the electrolysis cell. No gap containing sodium hydroxide solution is present here. This arrangement is typically also employed in fuel cell technology. A disadvantage here is that the sodium hydroxide solution which forms has to be passed through the OCE to the gas side and then flows downward along the OCE. In the course of this, the pores in the OCE must not be blocked by the sodium hydroxide solution, and sodium hydroxide must not crystallize in the pores. It has been found that very high sodium hydroxide solution concentrations can also arise here, but the ion exchanger membrane does not have long-term stability to these high concentrations (Lipp et al, J. Appl. Electrochem. 35 (2005)1015—Los Alamos National Laboratory "Peroxide formation during chlor-alkali electrolysis with carbon-based ODC").

A conventional oxygen-consuming electrode consists typically of an electrically conductive carrier element to which the gas diffusion layer with a catalytically active component has been applied. The hydrophobic component used is generally polytetrafluoroethylene (PTFE), which additionally serves as a polymeric binder of the catalyst. In the case of electrodes with a silver catalyst, the silver serves as a hydrophilic component. In the case of carbon-supported catalysts, the carrier used is a carbon with hydrophilic pores, through which the liquid can be transported.

The catalyst used is generally a metal, a metal compound, a nonmetallic compound or a mixture of metal compounds or nonmetallic compounds. However, metals applied to a carbon support are also known, especially metals of the platinum group.

However, only platinum and silver have gained practical significance as a catalyst for the reduction of oxygen in alkaline solutions.

Platinum is used exclusively in supported form. A preferred support material is carbon. Carbon conducts electrical currents to the platinum catalyst. The pores in the carbon particles can be hydrophilized by oxidation of the surfaces to make them suitable for the transport of water.

Silver can also be used in accordance with the prior art with carbon as a support, and also in the form of finely divided metallic silver.

In the case of production of OCEs with unsupported silver catalyst, the silver can be introduced at least partly in the form of silver oxides, which are then reduced to metallic silver. The reduction is effected either in the initial phase of the electrolysis, in which conditions already exist for reduction of silver compounds, or in a separate step prior to commencement of operation of the electrode, by electrochemical, chemical or other means known to those skilled in the art. The size of the silver particles is in the range from greater than 0.1 μm to 100 μm; typical particle sizes are 1 μm to 20 μm.

The production of oxygen-consuming electrodes with unsupported silver catalysts can in principle be divided between dry and wet manufacturing processes.

In the dry processes, a mixture of catalyst and polymeric component is ground to fine particles. This precursor is subsequently distributed over the electrically conductive carrier element and pressed at room temperature. Such a process is described in EP 1728896 A2.

In the wet manufacturing processes, a precursor in the form of a paste or of a suspension comprising fine silver particles and a polymeric component is used. Suspension medium used is generally water, but it is also possible to use other liquids such as alcohols or mixtures thereof with water. In the production of the pastes or suspension, it is possible to add surface-active substances in order to increase the stability thereof. The pastes are applied to the carrier element by means of screen printing or calendering, while the less viscous suspensions are typically sprayed onto the carrier element. The paste or suspension is gently dried after the emulsifier has been rinsed out, and then sintered at temperatures in the region of the melting point of the polymer. Such a process is described, for example, in US20060175195 A1.

The in the above-described oxygen-consuming electrode with unsupported silver catalysts have a good long-term stability under the conditions of electrolysis of alkali metal chlorides.

An important prerequisite for the operation of gas diffusion electrodes is that both the liquid and gaseous phases may be present simultaneously in the pore system of the electrodes. The gas is transported in pores with hydrophobic surfaces. These are primarily the pores which are formed by the fluoropolymer matrix. Hydrophobic pores are also present in the carbon, unless they have been provided with a hydrophilic surface by specific treatment. The liquid is transported in the pores with hydrophilic surfaces. These are generally pores which are formed by the silver catalyst, but also pores in hydrophilized carbons, as used as a support for catalysts. The pores for gas transport preferably have a greater diameter than the pores for liquid transport. The latter fill up completely with liquid; the capillary forces counteract the gas pressure. If the gas pressure is too high, liquid is displaced from the hydrophobic pores; conversely, in the case of excessive pressure on the liquid side, hydrophobic pores are flooded. Due to the lower capillary action, liquid is displaced more easily from the larger hydrophobic pores than from small pores.

The OCE should be impervious at a pressure differential between the gas and liquid spaces in the range from 10 to 60 mbar. What is meant here by "impervious" is that the naked eye cannot observe escape of gas bubbles into the electrolyte space, and less than 10 g/(h*cm$^2$) of liquid passes through the OCE (g=mass of liquid, h=hour and cm$^2$=geometric electrode surface area). If, however, too much liquid passes through the OCE, it can only flow downward on the side facing the gas side. This can form a liquid film which hinders the access of gas to the OCE and thus has an extremely adverse effect on the performance of the OCE (oxygen undersupply). If too much gas enters the electrolyte space, the gas bubbles close off some of the electrode and membrane area, which leads to a shift in current density and hence, in galvanostatic operation of the cell, to a local increase in current density and to an unwanted increase in cell voltage over the cell.

The production of the electrodes by the known dry and wet processes gives rise to pores of different size and distribution. The size and distribution can be controlled by the selection and pretreatment of the polymers and of the catalysts, and the method of application to the carrier. It is also possible to add pore-forming components in the course of production of the oxygen-consuming electrode. A known example is the addition of ammonium carbonate powder to the mixture of catalyst and polymeric component, which is driven out by heating after compaction of the catalyst mixture.

The flow resistance in the pores is inversely proportional to the diameter thereof. The known processes for production of OCEs give rise to pore distributions which ensure sufficient mass transfer. However, there is always a proportion of pores which are too small or too large. While the small pores are not troublesome in any way, the large pores offer too low a resistance to gas flow, which readily results in unwanted passage of gas through the electrode.

It is also possible, in the pressing and sintering processes mentioned, for channels and cracks to occur in the gas diffusion layer, through which gas can again pass into the liquid phase. Such channels and cracks can also form in the course of operation of an oxygen-consuming electrode, which worsens the performance over the service life.

It is an object of the present invention to provide an oxygen-consuming electrode for oxygen reduction under alkaline conditions, for example for use in chloralkali electrolysis, which overcomes the above disadvantages and enables a lower operating voltage in chloralkali electrolysis.

It is a specific object of the invention to provide an oxygen-consuming electrode which has low gas perviosity than conventional electrodes.

It is a further object of the invention to provide a simple means for improving or repairing existing oxygen-consuming electrodes which have started to leak or whose performance is or has become inadequate.

The object is achieved by providing the oxygen-consuming electrodes (OCEs) known per se, on the side facing towards the liquid or the ion exchanger membrane, with a finely divided hydrophilic component, said finely divided hydrophilic component being applied to the oxygen-consuming electrode in the form of a suspension in a suspension medium removable by vaporization.

EMBODIMENTS OF THE INVENTION

An embodiment of the present invention is an oxygen-consuming electrode comprising (1) at least one carrier in the form of a flat structure, (2) a coating with a gas diffusion layer, and (3) a catalytically active component, wherein the oxygen-consuming electrode further comprises a finely divided hydrophilic component having a mean particle diameter in the range from 20 to 100 nm on a side which faces towards liquid or an ion exchanger membrane when in operation.

Another embodiment of the present invention is the above oxygen-consuming electrode, wherein the finely divided hydrophilic component catalyses the reduction of oxygen.

Another embodiment of the present invention is the above oxygen-consuming electrode, wherein the finely divided hydrophilic component is silver.

Another embodiment of the present invention is the above oxygen-consuming electrode, wherein the finely divided hydrophilic component covers from 5 to 80% of the entry area of the hydrophilic pores in the oxygen-consuming electrode.

Another embodiment of the present invention is the above oxygen-consuming electrode, wherein the oxygen-consuming electrode comprises, as a catalytically active component, silver, silver(I) oxide, silver(II) oxide, or mixtures thereof.

Another embodiment of the present invention is the above oxygen-consuming electrode, wherein the oxygen-consuming electrode, apart from the finely divided hydrophilic component, comprises mixtures which contain, as a catalytically active component, from 70 to 95% by weight of silver oxide, from 0 to 15% by weight of silver metal, and from 3 to 15% by weight of an insoluble fluorinated polymer.

Another embodiment of the present invention is the above oxygen-consuming electrode, wherein the oxygen-consuming electrode has, as a carrier element, an electrically conductive flat structure.

Yet another embodiment of the present invention is a fuel cell or a metal/air battery comprising the above oxygen-consuming electrode.

Yet another embodiment of the present invention is a process for producing the above oxygen-consuming electrode, comprising (1) applying or spraying a finely divided, hydrophilic component in a suspension with a concentration of from 0.1 to 50% by weight to a flat base electrode comprising at least one carrier in the form of a flat structure, a coating with a gas diffusion layer, and a catalytically active component, and (2) subsequently removing the suspension medium by evaporation.

Another embodiment of the present invention is the above process, wherein the suspension medium has a boiling point of from 50 to 150° C.

Another embodiment of the present invention is the above process, wherein the suspension medium is an alcohol.

Another embodiment of the present invention is the above process, wherein the amount of the finely divided component applied is 100 mg to 10 g per square meter of electrode area.

Another embodiment of the present invention is the above process, wherein the base electrode used is a spent or leaky oxygen-consuming electrode.

Another embodiment of the present invention is the above oxygen-consuming electrode, wherein the finely divided hydrophilic component having a mean particle diameter in the range from 40 to 80 nm.

Another embodiment of the present invention is the above oxygen-consuming electrode, wherein the finely divided hydrophilic component having a mean particle diameter in the range from 50 to 70 nm.

Another embodiment of the present invention is the above oxygen-consuming electrode, wherein the silver oxide is silver(I) oxide and the insoluble fluorinated polymer is PTFE.

Another embodiment of the present invention is the above oxygen-consuming electrode, wherein the electrically conductive flat structure is based on nickel or silver-coated nickel.

Another embodiment of the present invention is the above process, wherein the finely divided, hydrophilic component is in a suspension with a concentration of from 1 to 20% by weight.

Another embodiment of the present invention is the above process, wherein the suspension medium has a boiling point of from 60 to 100° C.

Another embodiment of the present invention is the above process, wherein the suspension medium is i-propanol.

Another embodiment of the present invention is the above process, wherein the amount of the finely divided component applied is 1 to 5 g per square meter of electrode area

DETAILED DESCRIPTION OF THE INVENTION

The invention provides an oxygen-consuming electrode comprising at least one carrier in the form of a flat structure and a coating with a gas diffusion layer and a catalytically active component, characterized in that the oxygen-consuming electrode, on a side which, in operation, faces towards the liquid or the ion exchanger membrane (hereinafter also called liquid side for short), additionally has a finely divided hydrophilic component having a mean particle diameter in the range from 20 to 100 nm, preferably 40 to 80 nm and more preferably 50 to 70 mm.

Preferably, the finely divided hydrophilic component has a specific surface area (coverage with nitrogen according to BET DIN ISO 9277) in the range from 8 to 12 m²/g.

Preference is given to a novel oxygen-consuming electrode, characterized in that the oxygen-consuming electrode has, on its one side facing towards the liquid in operation, a finely divided hydrophilic component which catalyses the reduction of oxygen. The side of the oxygen-consuming electrode facing towards the liquid also faces towards the ion exchanger membrane after incorporation into an electrolysis cell.

The finely divided hydrophilic component more preferably comprises silver particles.

The approach in the technical solution here is to reduce the diameter of oversize hydrophilic pores or of cracks on the liquid side of the oxygen-consuming electrode by accumulation of fine hydrophilic particles, but at the same time still to ensure sufficient liquid transport and to provide additional catalytically active sites.

The mean diameter of the fine hydrophilic particles is typically a factor of 2-10 below the mean diameter of the catalyst particles incorporated in the polymer matrix. The finely divided component has a mean particle diameter in the range from 20 to 100 nm, preferably 40 to 80 nm and more preferably 50 to 70 nm. (The particle diameter is determined by means of electron microscopy or comparable processes.) The production of comparable fine particles is known in principle. Descriptions of the production of corresponding particles can be found, for example, in DE102006017696A1 or U.S. Pat. No. 7,201,888B2. However, no application as in the present invention is disclosed.

The finely divided component is hydrophilic and accumulates on the likewise hydrophilic catalyst particles. It is possible to use any substances which have the appropriate particle size and a hydrophilic surface, i.e. a surface having a contact angle with respect to water under standard conditions of less than 90°.

The finely divided hydrophilic component more preferably consists of substances which catalyse the reduction of oxygen. In the case of use of such catalytically active substances, the number of catalytically active sites in the gas/liquid/solid three-phase region is increased. The performance of the electrode improves, which is perceptible in a reduction in the operating voltage. Particular preference is therefore given to hydrophilic particles based on silver.

The novel oxygen-consuming electrodes have a characteristic structure on the side facing towards the liquid phase. In a scanning electron microscope, filigree agglomerations of small particles can be seen on the surface, which have been introduced in the spaces between the catalyst particles bound in the matrix and are in contact therewith. The small particles form ridges between individual catalyst particles. The open area of the pores between the bound catalyst particles is reduced. A schematic diagram of the surface of an oxygen-consuming electrode before and after the treatment by the process according to the invention is given in FIGS. 1 and 2.

In a novel oxygen-consuming electrode, there are preferably 100 mg to 10 g, more preferably 1 g to 5 g, of the fine hydrophilic particles per square meter of electrode area. The hydrophilic particles are preferably deposited on the surface of the oxygen-consuming electrode in the openings of the hydrophilic pores, but do not penetrate any deeper into the pores. The hydrophilic particles are especially connected to one another, and bridges are formed between some of the catalyst particles bonded in the matrix. The hydrophilic particles cover part of the pore opening; preferably 5-80% of the entry area of the hydrophilic pores in the oxygen-consuming electrode is covered.

The finely divided hydrophilic component is applied in such a way that the fine hydrophilic particles are deposited in the pores formed by the catalyst particles incorporated in the polymer matrix, or on the catalyst particles. The application is preferably effected in a suspension onto an oxygen-consuming electrode preformed from carrier, gas diffusion layer and catalytically active component. The concentration of the hydrophilic particles in the suspension is preferably 0.1 to 50% by weight, more preferably 1 to 20% by weight.

The invention also provides a process for producing oxygen-consuming electrodes, which is characterized in that a finely divided, hydrophilic component is applied or sprayed in a suspension with a concentration of 0.1-50% by weight, preferably 1-20% by weight, to a flat base electrode comprising at least one carrier in the form of a flat structure and a coating with a gas diffusion layer and a catalytically active component, and in that the suspension medium is subsequently removed by evaporation.

The base electrode used in the novel process is preferably an oxygen-consuming electrode which is spent or leaky (i.e. afflicted with relatively high passage of gas or liquid in operation).

The suspension media used may be the liquids suitable for the respective finely divided component. For instance, it is possible to use protic suspension media such as water or alcohols, or aprotic polar suspension media such as acetone or dimethyl carbonate. Preference is given to suspension media having a high volatility and a boiling point of 50-150° C., preferably 60-100° C. Preference is given to alcohols, particular preference to i-propanol. Also conceivable are mixtures of the aforementioned suspension media. It is possible to add the customary dispersing aids such as fatty acids or polyvinylpyrrolidone to the suspension.

The suspension can be applied by one of the coating technologies known in principle, such as application by means of a brush, a roller, a coating bar or another tool, or by direct spray application or casting. The coating can be effected in one operation or in several operations with intermediate removal of at least a portion of the solvent.

Preferably 100 mg to 10 g, preferably 1 to 5 g, of the finely divided hydrophilic component are applied per square meter of electrode area.

The suspension applied is dried by techniques known in principle from coating technology. Preference is given to drying in a forced-air dryer, in which case the vaporized the solvent is recovered. The drying can be supported by additional heating, for example by infrared radiators.

The temperature and air or gas velocity are selected such that there is no removal of the nanoparticles with the gas stream. The temperature, at least in the initial phase of the drying step, should be below the boiling point of the suspension medium; after removal of more than 90% of the suspension medium, the temperature can be raised to ranges above the boiling point. The flow rate is preferably selected such that a laminar flow forms at the surface of the electrode. Preference is given to a flow rate less than 0.45 m/sec.

The electrode can be sintered by further heating after removal of the solvent. The sintering is effected especially within the temperature range of 60-330° C. known from the production of electrodes.

The electrode can be consolidated further by pressing after removal of the solvent. The pressing can be effected by means of a die, a roller or another pressing technique known per se. Preference is given to consolidation by means of rollers. Particular preference is given here to applying a pressing force of 0.01 to 7 kN/cm (linear force).

The finely divided component is preferably applied to an electrode produced by one of the known production processes in a downstream processing step. For instance, after the dry or wet production process known from the prior art and mentioned at the outset, oxygen-consuming electrodes which are ready to use in principle are obtained in a first step. If these oxygen-consuming electrodes are treated, for example, by spray application of a suspension of silver with a mean particle size of 20-100 nm, preferably 40-80 nm, more preferably 50-70 nm, after vaporization of the suspension medium and subsequent drying, electrodes are obtained, which have a distinct improvement in perviosity with respect to oxygen compared to the untreated electrodes and work at a reduced operating voltage.

The application of the finely divided component may actually precede completion of the electrode. For instance, in the case of an electrode produced by the wet process, the finely divided component can be applied prior to the sintering step.

In principle, all gas diffusion electrodes are suitable, irrespective of their composition and the method of production thereof, as a starting stage for the production of the inventive oxygen-consuming electrodes.

Preference is given to applying the application of the finely divided hydrophilic component to an oxygen-consuming electrode which has, as a catalytically active component, silver, silver(I) oxide or silver(II) oxide, or mixtures of silver and silver oxide. The silver content here is 65 to 97% by weight, and also 3 to 35% by weight of an insoluble fluorinated polymer, especially PTFE.

The novel oxygen-consuming electrode more preferably comprises mixtures which, as a catalytically active component, contain 70 to 95% by weight of silver oxide, especially silver(I) oxide, and 0-15% by weight of silver metal, and also 3-15% by weight of an insoluble fluorinated polymer, especially PTFE.

The carrier element may especially be used in the form of a mesh, nonwoven, foam, woven, braid, knit, expanded metal, or of another permeable flat structure. Preference is given to using a flexible textile structure, preferably electrically conductive, especially consisting of metal filaments. Particularly suitable materials for the carrier element are nickel and silver-coated nickel.

A further preferred version of the novel oxygen-consuming electrode is therefore characterized in that it comprises, as a carrier element, a flexible textile structure, especially composed of metal filaments, preferably composed of nickel or and silver-coated nickel.

The novel oxygen-consuming electrode is preferably connected as a cathode, and especially operated in an electrolysis cell for the electrolysis of alkali metal chlorides, preferably of sodium chloride or potassium chloride, more preferably of sodium chloride. The invention consequently also provides an electrolysis apparatus, especially for chloralkali electrolysis, comprising a novel above-described oxygen-consuming electrode as an oxygen-consuming cathode.

Alternatively, the oxygen-consuming electrode can preferably be connected as a cathode in a fuel cell.

The invention further provides for the use of the novel oxygen-consuming electrode for reduction of oxygen under alkaline conditions, especially in the alkaline fuel cell, and use thereof in drinking water treatment, for example for preparation of sodium hypochlorite, or use thereof in chloralkali electrolysis, especially for electrolysis of LiCl, KCl or NaCl.

The novel oxygen-consuming electrode is more preferably used in chloralkali electrolysis, and here especially in sodium chloride (NaCl) electrolysis.

In another aspect of the invention, it has been found that, surprisingly, oxygen-consuming electrodes known per se can be improved, or improved in terms of their gas imperviosity, by applying a finely divided component as described above. The invention therefore also provides for the use of suspensions of finely divided components for repair, sealing or improvement of damaged or spent oxygen-consuming electrodes.

For instance, electrodes whose imperviosity has declined in operation, and which as a result have an increase in the operating voltage, can be improved by application of a suspension of fine particles. However, it is also possible to repair newly manufactured oxygen-consuming electrodes where testing of gas imperviosity and/or operating voltage has found inferior performance, by applying a suspension of fine particles.

The invention is illustrated in detail hereinafter, with reference to the figures, by the examples, but these do not constitute a restriction of the invention.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

An oxygen-consuming electrode manufactured by the wet process was incorporated into an electrolysis half-cell. The electrode had, at 4 kA/m$^2$, a potential of −400 mV (measured against an Ag/AgCl electrode). The electrode is permeable to visible amounts of oxygen (formation of small gas bubbles) at a pressure differential of 20 mbar between gas side and liquid side.

The oxygen-consuming electrode was deinstalled, rinsed with deionized water and dried on the outside. 100 g/m$^2$ of a suspension of 1.4 g of nanoscale silver powder of the SP-7000-95 type from Ferro Corporation, Cleveland, USA, (mean particle diameter 60 nm) in 100 g of i-propanol were sprayed on. The isopropanol was vaporized, then the electrode was dried at 80° C. in a drying cabinet for 30 min, and then installed back into the electrolysis half-cell. At 4 kA/m$^2$, the electrode had a potential of −320 mV and was impervious at a pressure differential of 40 mbar between gas side and liquid side.

Thus, the treatment of the surface with nanoscale silver powder improved the potential by 80 mV, and generated clear imperviosity to gas and liquid.

Figure 1:
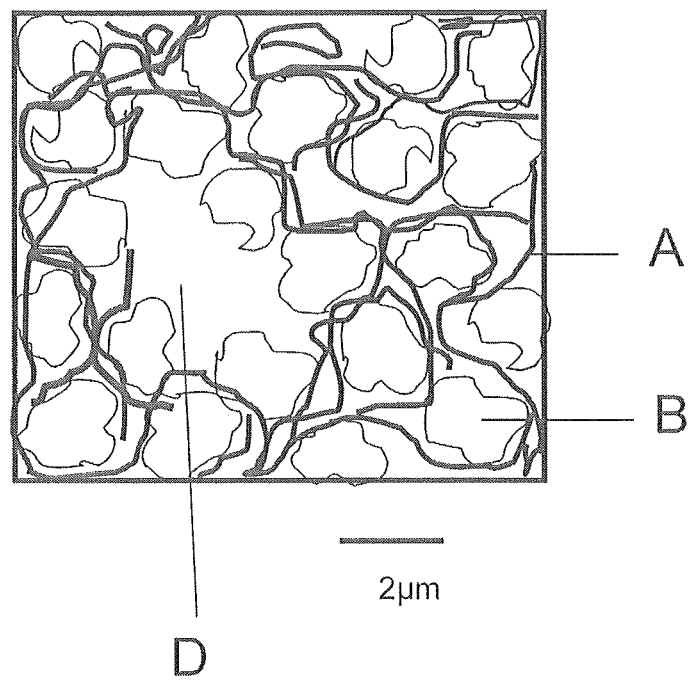
FIG. 1 The surface of the oxygen-consuming electrode before the treatment by the process according to the invention FIG. 2 The surface of the oxygen-consuming electrode after the treatment by the process according to the invention In the figures, the reference symbols are defined as follows:
A: PTFE
B: Silver crystals
C: Nanoscale silver
D: Oversize hydrophilic pore

FIG. 1 shows a schematic of the surface of the oxygen-consuming electrode facing the liquid in microscopic view before the treatment with a suspension comprising fine silver particles. The catalyst particles B are held by the filamentous PTFE matrix A; oxygen can break through to the liquid side through an oversize pore D.

Figure 2:
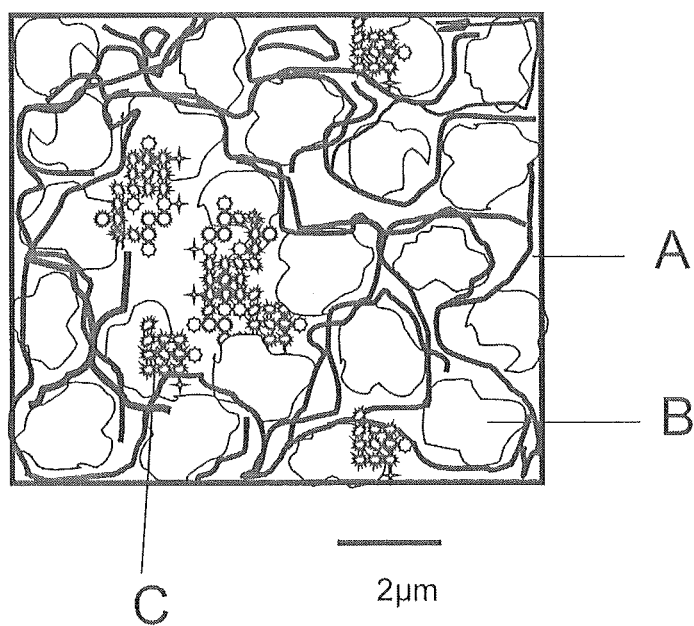

FIG. 2 shows the surface of the same oxygen-consuming electrode after treatment with a suspension comprising fine silver particles. The fine silver particles C have been deposited between the catalyst particles; the clear area of the pore opening is reduced. The pore can hold the liquid better; passage of oxygen into the liquid phase is more difficult. In addition, the number of catalytically active sites in the phase interface has increased, which results in increased conversion.

The invention claimed is:

1. An oxygen-consuming electrode comprising (1) at least one carrier in the form of a flat structure, (2) a coating with a gas diffusion layer, and (3) a catalytically active component comprising silver, silver(I) oxide, silver(II) oxide, or mixtures thereof, wherein the oxygen-consuming electrode further comprises hydrophilic pores with an entry, and a finely divided hydrophilic component having a specific surface area in the range of from 8 to 12 m$^2$/g, having a mean particle diameter in the range from 20 to 100 nm and in an amount of from 100 mg to 10 g/m$^2$ of electrode area, on a side which faces towards liquid or an ion exchanger membrane when in operation.

2. The oxygen-consuming electrode of claim 1, wherein the finely divided hydrophilic component catalyses the reduction of oxygen.

3. The oxygen-consuming electrode of claim 1, wherein the finely divided hydrophilic component is silver.

4. The oxygen-consuming electrode of claim 1, wherein the finely divided hydrophilic component covers from 5 to 80% of the entry area of the hydrophilic pores in the oxygen-consuming electrode.

5. The oxygen-consuming electrode of claim 1, wherein the oxygen-consuming electrode, apart from the finely divided hydrophilic component, comprises mixtures which contain, as a catalytically active component, from 70 to 95% by weight of silver oxide, from 0 to 15% by weight of silver metal, and from 3 to 15% by weight of an insoluble fluorinated polymer.

6. The oxygen-consuming electrode of claim 5, wherein the silver oxide is silver(I) oxide and the insoluble fluorinated polymer is PTFE.

7. The oxygen-consuming electrode of claim 1, wherein the oxygen-consuming electrode has, as a carrier element, an electrically conductive flat structure.

8. The oxygen-consuming electrode of claim 7, wherein the electrically conductive flat structure is based on nickel or silver-coated nickel.

9. A fuel cell or a metal/air battery comprising the oxygen-consuming electrode of claim 1.

10. The oxygen-consuming electrode of claim 1, wherein the finely divided hydrophilic component having a mean particle diameter in the range from 40 to 80 nm.

11. The oxygen-consuming electrode of claim 1, wherein the finely divided hydrophilic component having a mean particle diameter in the range from 50 to 70 nm.

12. The oxygen-consuming electrode of claim 1, comprising the finely divided hydrophilic component in an amount of from 1 g to 5 g/m$^2$ of electrode area.

13. A process for producing the oxygen-consuming electrode of claim 1, comprising (1) applying or spraying a finely divided, hydrophilic component in a suspension with a concentration of from 0.1 to 50% by weight to a flat base electrode comprising at least one carrier in the form of a flat structure, a coating with a gas diffusion layer, and a catalytically active component, and (2) subsequently removing the suspension medium by evaporation.

14. The process of claim 13, wherein the suspension medium has a boiling point of from 50 to 150° C.

15. The process of claim 13, wherein the suspension medium is an alcohol.

16. The process of claim 13, wherein the amount of the finely divided component applied is 100 mg to 10 g per square meter of electrode area.

17. The process of claim 13, wherein the base electrode used is a spent or leaky oxygen-consuming electrode.

18. The process of claim 13, wherein the finely divided, hydrophilic component is in a suspension with a concentration of from 1 to 20% by weight.

19. The process of claim 13, wherein the suspension medium has a boiling point of from 60 to 100° C.

20. The process of claim 13, wherein the suspension medium is i-propanol.

21. The process of claim 13, wherein the amount of the finely divided component applied is 1 to 5 g per square meter of electrode area.

* * * * *